United States Patent [19]
Tarkiainen et al.

[11] Patent Number: 6,058,366
[45] Date of Patent: May 2, 2000

[54] GENERIC RUN-TIME ENGINE FOR INTERFACING BETWEEN APPLICATIONS AND SPEECH ENGINES

[75] Inventors: Erik Tarkiainen, Holliston, Mass.; Luc Van Tichelen, Waregem, Belgium

[73] Assignee: Lernout & Hauspie Speech Products N.V., Ypres, Belgium

[21] Appl. No.: 09/257,454

[22] Filed: Feb. 25, 1999

Related U.S. Application Data

[60] Provisional application No. 60/075,907, Feb. 25, 1998, and provisional application No. 60/076,634, Mar. 3, 1998.

[51] Int. Cl.[7] .............................. G10L 15/22; G06F 9/44
[52] U.S. Cl. .......................................... 704/270; 704/275
[58] Field of Search ..................................... 704/270, 275

[56] References Cited

U.S. PATENT DOCUMENTS

| | | | |
|---|---|---|---|
| 4,755,932 | 7/1988 | Diedrich | 379/88.16 |
| 5,255,305 | 10/1993 | Sattar | 379/34 |
| 5,452,341 | 9/1995 | Sattar | 379/88.27 |
| 5,546,586 | 8/1996 | Wetmore et al. | 395/705 |
| 5,666,534 | 9/1997 | Gilbert et al. | 713/1 |
| 5,835,913 | 11/1998 | Leavitt et al. | 707/204 |
| 5,890,163 | 3/1999 | Todd | 707/200 |

FOREIGN PATENT DOCUMENTS

| | | |
|---|---|---|
| 0218904 | 4/1987 | European Pat. Off. . |
| WO95/01597 | 1/1995 | WIPO . |

OTHER PUBLICATIONS

Victor W. Zue, "Navigating the Information Superhighway Using Spoken Language Interfaces," IEEE Expert, pp. 39–43, Oct. 1995.

"Application programing Interface for Speech Recognition System", IBM Technical Disclosure Bulletin, vol. 36, No. 6B, Jun. 1, 1993, pp. 11–12.

Primary Examiner—David R. Hudspeth
Assistant Examiner—Tālivaldis Ivars Šmits
Attorney, Agent, or Firm—Bromberg & Sunstein LLP

[57] ABSTRACT

A universal voice-data handling system for interfacing between a software application program and at least one speech-related application interface. The voice-data handling system includes a computer system; a run-time module, loaded into and running on the computer system, the run-time module adapted to a specialized task for running concurrently and interactively with the at least one speech-related application interface; and an initialization file, loaded into the computer system, containing parameters specific to the software application program the initialization file being generated by an application, based on the behavior required by the speech-related software application program for specifying a behavior of the run-time module in relation to the software application program the initialization file being generated by an application, based on the behavior required by the speech-related software application program.

19 Claims, 2 Drawing Sheets

GENERIC RUN-TIME ENGINE FOR INTERFACING BETWEEN APPLICATIONS AND SPEECH ENGINES

This application claims the benefit of U.S. Provisional Application No. 60/075,907, filed Feb. 25, 1998, and U.S. Provisional Application No. 60/076,634, filed Mar. 3, 1998.

TECHNICAL FIELD

The present invention pertains to a task-specialized, application-generic run-time engine for interfacing between a software application program and at least one speech-related application interface.

BACKGROUND OF THE INVENTION

The operation of software application programs which employ speech recognition or text-to-speech (TTS) features generally requires that the application program interact with engines, typically though not necessarily resident on the platform on which the application program is running, which perform automatic speech recognition (ASR) or TTS functions. This interaction between the application and ASR or TTS engines occurs via application interfaces (APIs) and requires that the application program itself generate the particular calls and protocol required by the APIs. It is desirable to obviate the development effort required to program the low-level interaction between the application program and the ASR or TTS engines, since much of this interaction involves functionalities common across many applications.

SUMMARY OF THE INVENTION

In accordance with one aspect of the invention, in one of its embodiments, there is provided a universal voice-data handling system for interfacing between a software application program and at least one speech-related application interface. The voice-data handling system has a computer and a run-time module, loaded into and running on the computer, adapted to a specialized task for running concurrently and interactively with at least one speech-related application interface. Additionally, the voice-data handling system has an initialization file, loaded into the computer, containing parameters specific to the software application program specifying a behavior of the run-time module.

In accordance with alternate embodiments of the present invention, the universal voice-data handling system may also have a data file including information pertinent to the execution of the specialized task by the run-time module. Although a wide range of specialized tasks may be implemented, the specialized task may, for example, be at least one of the following group of specialized tasks:

a. querying a person to obtain an affirmation/negation response;
b. querying a person to obtain calendric information;
c. prompting a person to select from a menu;
d. querying a person to obtain payment information;
e. reading text to a person and responding to clarification queries;
f. querying a person to obtain address information;
g. querying a person to obtain information for data fields in an application specific form;
h. prompting a person to provide a password;
i. querying a person to process queries to a database;
j. prompting a person to create a list of words selected for creation of specific lists or customized commands;
k. querying a person to obtain temporal information;
l. querying a person to obtain measurement information; and
m. providing a spoken announcement message.

In accordance with another embodiment of the present invention, there is provided a universal voice-data handling system that has a computer and a run-time module, loaded into and running on the computer, adapted to a specialized task for running concurrently and interactively with at least two speech-related application interfaces chosen from the group of an automated speech recognizer, a text-to-speech converter, a speech recorder/player, and a speech-and-music compressor/decompressor.

In any of the aforementioned embodiments, the universal voice-data handling system may also have an application for generating the initialization file which may include a graphic user interface.

In accordance with a further embodiment of the present invention, there is provided a software program stored in a digital storage medium which, when loaded into a computer, establishes a run-time module adapted to a specialized task for running concurrently and interactively with at least one speech-related application interface chosen from the group of an automated speech recognizer, a text-to-speech converter, a speech recorder/player, and a speech-and-music compressor/decompressor, and additionally establishes an initialization file containing parameters specific to the software application program for specifying a behavior of the run-time module.

BRIEF DESCRIPTION OF THE DRAWINGS

The invention will be more readily understood by reference to the following description, taken with the accompanying drawings, in which.

DETAILED DESCRIPTION OF THE PREFERRED EMBODIMENTS

The present invention provides a tool to the developer of a software application program to enable, for example, a computer dialog with a customer regarding a credit card transaction. Many such application programs require calls to engines which handle speech or sound-related functionalities, such as automated speech recognition (ASR) engines, text-to-speech (TTS) engines, speech recording/playback (SRP), speech and music compression/decompression (SMC), speaker verification, language identification, and gender verification engines, for example. These engines may generate or recognize particular words in a particular language. However, in order to gather or impart information to a customer, a conversational protocol may need to be structured. In the prior art, this function is typically developed as part of the application program.

Figure 1:
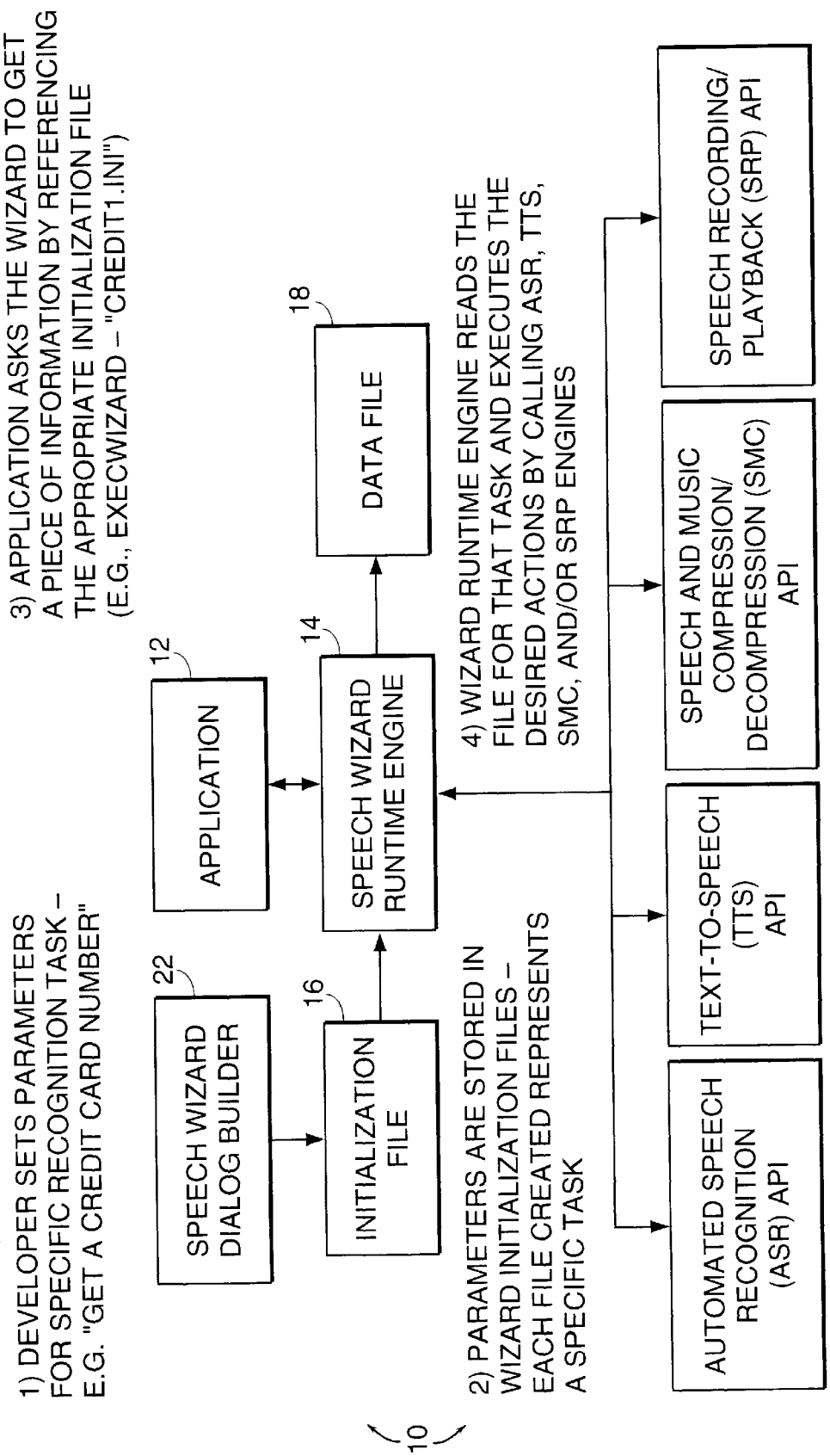
FIG. 1 is a block diagram of the interaction between an application program and one or more speech-related application interfaces in accordance with an embodiment of the present invention.

Referring to FIG. 1, a schematic diagram is presented of the components of a system, designated generally by numeral 10, which has been configured to employ the current invention. System 10 is to be regarded with complete generality, and no restriction is placed, within the scope of the invention, on the nature of the particular platform on which system 10 is implemented. In some embodiments, the various system modules may, in fact, be physically located on different computer platforms. Likewise, multiple versions of some modules may be implemented, e.g., multiple recognizers for different languages. Application interfaces (APIs) to ASR, TTS, SRP and SMC engines are shown, with the acronyms having the significance defined above.

During operation of system 10, application program 12 invokes a runtime engine 14 and passes to runtime engine 14 a reference to an initialization file 16. Application program 12 is customized by its developer to provide a specified function. In the course of performing that function, it may be required to solicit information by voice from a person such as a customer. Generation and interpretation of speech are generally conducted by highly specialized engines such as ASR, TTS, SRP and SMC engines, as discussed above. The interaction of the application with each highly specialized engine is typically built into the application by the developer, using a software development kit (SDK), either of a standalone variety geared specifically to particular specialized engines, or a more general toolkit such as an interactive voice response toolkit.

Certain tasks have a general applicability in computer telephony. In accordance with the present invention, runtime engine (alternatively referred to as a "Speech Wizard" or "Wizard" 14) engenders functionality for conducting certain types of dialogues which are broadly applicable. For example, runtime engine 14 may solicit and retrieve zip code information from a human speaker. General dialog behavior, such as handling time-outs, poor recognition, retries, etc., are loaded into the computer platform on which the application is running as part of runtime engine 14. Additionally, runtime engine 14 provides all the associated grammar information required by the ASR and TTS engines, by generating the grammars, by retrieving the grammar from the initialization file 16 in which the grammar was stored by the Speech Wizard Dialog Builder 22, or by translating or transforming the stored grammar. Runtime engines 14 may also apply specialized information, such as the logic of zip codes. The specialized information may be contained, in part, in the computer code comprising runtime engine 14, or, alternatively or additionally, recourse may be had by runtime engine 14 to a separate data file 18, resident on the computer or electronically accessible, containing further information. Data file 18 may be updatable either by the developer of the application program, by the provider of the Speech Wizard, or by a third-party provider, or by one of their applications residing on the computer in either real-time or off-line.

The application developer provides for the requirements of a particular task which the application program requires of the Wizard 14 by building one or more Wizard Initialization files 16 which are created by the application developer and furnished to the user. Wizard initialization file 16 is readily created by the application developer by applying a toolkit described below.

The specifics of the interaction grammar and the speech user interface (SUI) which models the ways people interact by way of voice are contained within Wizard 14 and need not be addressed by the application developer in developing the application. Additionally, postprocessing tasks may be handled by Wizard 14. For example, in the case of soliciting credit card, zip code, or social security numbers, the Wizard, before relaying the information to the application program, may check whether the recognized number is actually a valid response. This information may be used to increase recognition accuracy—i.e., the Wizard may be instructed to relay to the application program the first valid response received via the ASR interface.

Wizards, in accordance with preferred embodiments of the invention, may be implemented in a variety of different modules.

Menu Wizards:

Dynamic Menus—The Wizard reads information from a data file at runtime and creates an active vocabulary from the data. The developer simply points to a structured file (i.e. ASCII delimited, ODBC, etc.) That will contain the data to be read at runtime. Designed for small to medium lists (<100), this Wizard uses phonetic recognition of the spoken word. An alternative embodiment of the invention may reliably handle larger lists (>100).

Static Menus—The Wizard reads information from a data file at runtime and creates an active vocabulary from the data. The developer simply enters the words for the vocabulary in the Speech Wizard Dialog Builder, and sets properties for prompts, confirmations, etc. Designed for small to medium lists (<100), this Wizard uses phonetic recognition of the spoken word. An alternative embodiment of the invention may reliably handle larger lists (>100). The developer also has the ability to modify the pronunciation of items in the static menu from within the Speech Wizard Dialog Builder. A shared exception dictionary allows the developer to modify the pronunciation once for recognition and TTS (which is used to confirm the response).

Number Wizards:

Zip Codes—The Wizard retrieves a 5 or 9 digit US zip code, using information about the logic of zip codes and a database of valid zip codes to return the best valid recognition result. The zip code data file should be external and readable by the developer, since a preferred embodiment may provide updates to this module via Web site as US zip codes are added and changed. It may also be beneficial to allow the developer to improve recognition further by specifying a range of zip codes—i.e. only zip codes in California. Similar modules may be implemented to handle foreign zip codes.

Natural Numbers—The Wizard returns a natural number up to a range specified by the developer, and which is achievable by the recognizer. For example, numbers 1 to 100, where the spoken utterance could be "twenty four", "sixteen", etc.

Alphanumerics—The Wizard returns an alphanumeric string consisting of digits, letters, and symbols (dash, pound, etc.). The developer sets a format string, such as ###@@###, which would represent 3 digits, 2 letters, and 3 digits, with optional dashes. The alphanumeric string is compared against a database provided by the developer, such as a field of part numbers, order numbers, etc.

Credit Cards—The Wizard returns the top recognition of a 16 digit number, and also the best guess that represents a valid credit card number. Logic algorithms can be used to improve recognition, by recognizing that some recognition results can not be valid credit card numbers. It is important to return both results (best guess and first valid), to allow the application to decide which one to act on (if a caller provides an invalid credit card number, it may not be desirable to substitute the first valid number and take action on it).

Formatted Digits—Similar to alphanumerics, the Wizard returns a digit matching a formatted string. In this situation it is not necessary to compare against a database, although the Wizard will use confidence levels to confirm the result. The developer is also able to set properties to specify whether to confirm after each digit is spoken, after the string is spoken, or only confirm if the confidence level is low.

Social Security Number—The Wizard returns the top recognition of a 9 digit social security number, and also the best guess that represents a valid social security number. Logic algorithms can be used to improve recognition, by recognizing that some recognition results can not be valid social security numbers. An option to compare against a database of known caller SS numbers (i.e., a student registration system) should also be provided.

In addition, we recognized as a result of the survey that barge-in support is important, and that digit recognition should always be offered in parallel with a DTMF option—the Speech Wizard should return a digit string regardless of whether or not the digits were spoken or pressed on the keypad. The option of barge-in support and the availability of DTMF as an alternative is not specific to the number wizards, but applies to all wizards.

Calendar Wizards:

Days—The Wizard returns a day in numeric format based on spoken input. The utterance could be "Next Tuesday", "yesterday", "tomorrow", etc.

Dates—The Wizard returns a day/month/year in numeric format based on spoken input. The utterance could be "January twenty fourth", "one twenty four", etc. Confirmation Wizard: The Wizard returns an affirmative or negative response based on spoken input, which could include "Yes", "No", "OK", "No, thank you", or similar possible responses. Reading Wizard: The Wizard reads a text file, specified at design time or run time by the developer, such as an e-mail message, a news story, directions to an office, etc. The Wizard listens for and interprets spoken commands such as "Previous Sentence", "Repeat Message", etc. to allow the caller to navigate through the message.

Address Wizard: goes through all steps of asking for a street address (zip code, street name, number, city, state, telephone number);

Form Filling Wizard: similar to address wizard, but the fields may be configured by the developer (whereas for the address wizard the fields such as street, state etc. have been predefined). The wizard may attempt to fill fields marked as required, while filling optional fields with information if spoken by the user;

Password Wizard: to obtain a password through DTMF or potentially even speaker verification;

SQL Wizard: to process queries to a database (e.g. by means of SQL) stated in natural language;

User Word Wizard: to create a list of words trained by the user for creation of specific lists or customized commands;

Times Wizard: similar to the day and dates wizard;

Weight, Length, Speed Etc. Wizards: for other specific measurement units

Speak Wizard: the simplest of all, just speaks a message without expecting any speech input (no ASR or DTMF), useful for announcement phrases.

Alternative embodiments of the present invention may implement other Wizard modules.

Figure 2:
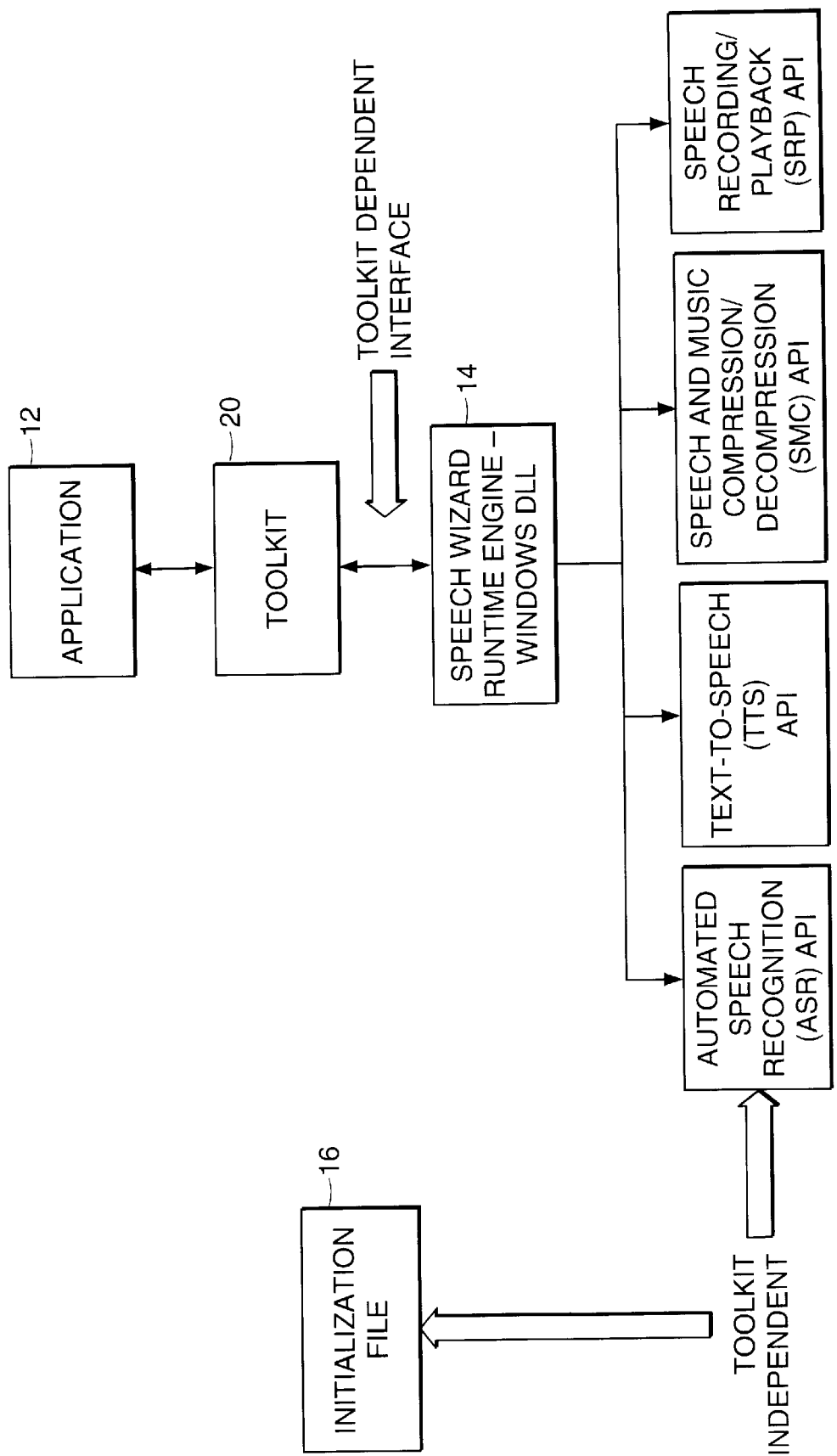
FIG. 2 is a block diagram of a configuration for the development of application programs employing one or more speech-related application interfaces in accordance with an embodiment of the present invention.

Development of the application program interaction with the Speech Wizard 14 is described with reference to FIG. 2. The developer employs a toolkit 20 to select specific Wizards (such as a credit card or natural number wizard, etc.) and to set the properties for behavior of a specific Wizard. The properties which are set for behavior of a specific Wizard reside as parameters in Wizard initialization file 16. Toolkit 20 invokes a Speech Wizard Dialog Builder 22 (shown in FIG. 1) which is independent of the particular toolkit employed, thus the developer may use any available speech development toolkit which supports the Speech Wizard Dialog Builder. In a preferred embodiment, Speech Wizard Dialog Builder 22 is itself a graphic user interface (GUI) which prompts the application program developer to select specific Wizards and to set the desired properties by graphic interaction. For example, the developer might set the types of valid credit cards and to prompt for the expiration date, etc.

The described embodiments of the invention are intended to be merely exemplary and numerous variations and modifications will be apparent to those skilled in the art. All such variations and modifications are intended to be within the scope of the present invention as defined in the appended claims.

We claim:

1. A universal voice-data handling system for interfacing between a software application program and at least one speech-related application interface, the voice-data handling system comprising:
 a. a computer system;
 b. a run-time module, loaded into and running on the computer system, the run-time module adapted to a specialized task for running concurrently and interactively with the at least one speech-related application interface;
 c. an initialization file, loaded into the computer system, containing parameters specific to the software application program for specifying a behavior of the run-time module in relation to the software application program; and
 d. an application for generating the initialization file based on the behavior required by the software application program.

2. A universal voice-data handling system according to claim 1, further comprising a data file including information pertinent to execution of the specialized task by the run-time module.

3. A universal voice-data handling system according to claim 1, wherein the specialized task includes at least one of the group of:
 a. querying a person to obtain an affirmation/negation response;
 b. querying a person to obtain calendric information;
 c. prompting a person to select from a menu;
 d. querying a person to obtain payment information;
 e. reading text to a person and responding to clarification queries;
 f. querying a person to obtain address information;
 g. querying a person to obtain information for data fields in an application-specific form;
 h. prompting a person to provide a password;
 i. querying a person to process queries to a database;
 j. prompting a person to create a list of words selected for creation of specific lists or customized commands;
 k. querying a person to obtain temporal information;
 l. querying a person to obtain measurement information; and
 m. providing a spoken announcement message.

4. A universal voice-data handling system according to claim 1, wherein the application for generating the initialization file includes a graphic user interface.

5. A universal voice-data handling system according to claim 1, in which the run-time module and the initialization file are resident on a single computer platform.

6. A universal voice-data handling system according to claim 5, in which the speech-related application interfaces are resident on the same computer platform as the run-time module and the initialization file.

7. A universal voice-data handling system according to claim 5, in which the speech-related application interfaces are resident on a different computer platform from the run-time module and the initialization file.

8. A universal voice-data handling system according to claim 1, in which the run-time module and the initialization file are resident on different computer platforms.

9. A universal voice-data handling system according to claim 8, in which the speech-related application interfaces are resident on the same computer platform as either the run-time module or the initialization file.

10. A universal voice-data handling system according to claim 8, in which the speech-related application interfaces are resident on a different computer platform from either the run-time module or the initialization file.

11. A universal voice-data handling system comprising:
   a. a computer system;
   b. a run-time module, loaded into and running on the computer system, the run-time module adapted to a specialized task for running concurrently and interactively with at least two speech-related application interfaces chosen from the group of an automated speech recognizer, a text-to-speech converter, a speech recorder/player, a speech-and-music compressor/decompressor, speaker verification, language identification, and gender verification;
   c. an initialization file, loaded into the computer system, containing parameters specific to the software application program for specifying a behavior of the run-time module in relation to the software application program; and
   d. an application for generating the initialization file based on the behavior required by the software application program.

12. A universal voice-data handling system according to claim 11, wherein the application for generating the initialization file includes a graphic user interface.

13. A universal voice-data handling system according to claim 11, in which the run-time module and the initialization file are resident on a single computer platform.

14. A universal voice-data handling system according to claim 13, in which the speech-related application interfaces are resident on the same computer platform as the run-time module and the initialization file.

15. A universal voice-data handling system according to claim 13, in which the speech-related application interfaces are resident on a different computer platform from the run-time module and the initialization file.

16. A universal voice-data handling system according to claim 11, in which the run-time module and the initialization file are resident on different computer platforms.

17. A universal voice-data handling system according to claim 16, in which the speech-related application interfaces are resident on the same computer platform as either the run-time module or the initialization file.

18. A universal voice-data handling system according to claim 16, in which the speech-related application interfaces are resident on a different computer platform from either the run-time module or the initialization file.

19. A software program stored in a digital storage medium, the program, when loaded into a computer system, establishing:
   a. a run-time module adapted to a specialized task for running concurrently and interactively with at least one speech-related application interface chosen from the group of an automated speech recognizer, a text-to-speech converter, a speech recorder/player, a speech-and-music compressor/decompressor, speaker verification, language identification, and gender verification, the software program;
   b. an initialization file containing parameters specific to the software application program for specifying a behavior of the run-time module; and
   c. an application for generating the initialization file based on the behavior required by the software application program.

* * * * *